United States Patent
Kim

(10) Patent No.: US 10,604,126 B2
(45) Date of Patent: Mar. 31, 2020

(54) APPARATUS FOR CONTROLLING VEHICLE AND CONTROL METHOD THEREOF

(71) Applicant: MANDO CORPORATION, Gyeonggi-do (KR)

(72) Inventor: Gi-Min Kim, Gyeonggi-do (KR)

(73) Assignee: MANDO CORPORATION, Gyeonggi-Do (KR)

(*) Notice: Subject to any disclaimer, the term of this patent is extended or adjusted under 35 U.S.C. 154(b) by 97 days.

(21) Appl. No.: 15/458,935

(22) Filed: Mar. 14, 2017

(65) Prior Publication Data
US 2017/0267219 A1 Sep. 21, 2017

(30) Foreign Application Priority Data
Mar. 15, 2016 (KR) .................. 10-2016-0030821

(51) Int. Cl.
*B60T 7/12* (2006.01)
*G05B 15/02* (2006.01)

(52) U.S. Cl.
CPC .............. *B60T 7/12* (2013.01); *G05B 15/02* (2013.01); *B60T 2250/00* (2013.01); *B60T 2270/00* (2013.01)

(58) Field of Classification Search
CPC .... B60T 7/12; B60T 2201/00; B60T 2201/06; B60T 2201/083; B60T 2201/10;
(Continued)

(56) References Cited

U.S. PATENT DOCUMENTS

| 9,731,722 B2 * | 8/2017 | Khafagy | B60W 30/18109 |
| 2003/0227215 A1 * | 12/2003 | Kinder | B60T 7/122 303/3 |

(Continued)

FOREIGN PATENT DOCUMENTS

| CN | 101423057 | 5/2009 |
| CN | 201415674 | 3/2010 |

(Continued)

OTHER PUBLICATIONS

Mazda, "Mazda Mazda6: Dynamic Stability Control (DSC)," Jun. 21, 2013, https://web.archive.org/web/20130621053411/http://www.msedan.com/dynamic_stability_control_dsc_-3961.html (Year: 2013).*

(Continued)

*Primary Examiner* — Thomas G Black
*Assistant Examiner* — Sara J Lewandroski
(74) *Attorney, Agent, or Firm* — Ladas & Parry, LLP

(57) ABSTRACT

Disclosed herein are an apparatus for controlling a vehicle and method thereof. An apparatus for controlling a vehicle, the apparatus includes an inputter configured to receive a start operation signal from a starter, receive an AVH mode operation signal from an Automatic Vehicle Hold(AVH), receive Wheel information, longitudinal acceleration information and AVH switch information from an Electronic Stability Control(ESC), and a determiner configured to determine whether the AVH mode operation signal is an ON operation signal when the start operation signal is an OFF operation signal, and determines whether the at least one of the wheel information, the longitudinal acceleration information and the AVH switch information is in a normal state when the AVH mode operation signal is the ON operation signal and a controller configured to control an Electronic Parking Brake(EPB) to perform parking in the EPB when the at least one of the wheel information, the longitudinal acceleration information, and the AVH switch information is in the normal state.

20 Claims, 5 Drawing Sheets

(58) Field of Classification Search
CPC ............. B60T 2250/00; B60T 2250/04; B60T 2260/00; B60W 30/18118
See application file for complete search history.

(56) References Cited

U.S. PATENT DOCUMENTS

| | | | | |
|---|---|---|---|---|
| 2006/0052926 A1* | 3/2006 | Okada | ........................ | B60T 7/12 701/51 |
| 2006/0229771 A1* | 10/2006 | Messner | .................... | B60T 7/12 701/1 |
| 2007/0090692 A1* | 4/2007 | Kamikado | .............. | B60T 7/122 303/192 |
| 2008/0262687 A1* | 10/2008 | Fujita | ........................ | B60T 7/12 701/70 |
| 2009/0187324 A1* | 7/2009 | Lu | .......................... | B60K 31/00 701/94 |
| 2013/0024058 A1* | 1/2013 | Han | ...................... | B60W 20/00 701/22 |
| 2014/0129107 A1* | 5/2014 | Taylor | .................... | B60T 13/662 701/70 |
| 2016/0121861 A1* | 5/2016 | Korte | ........................ | B60T 7/12 701/70 |
| 2016/0332627 A1* | 11/2016 | Yoon | .................... | B60W 30/186 |
| 2016/0339888 A1* | 11/2016 | Yokoyama | .............. | B60T 7/042 |
| 2017/0166210 A1* | 6/2017 | Kim | .................. | B60W 30/18118 |
| 2017/0182991 A1* | 6/2017 | Uehara | ................. | B60T 13/662 |
| 2017/0203762 A1* | 7/2017 | Khafagy | ................ | B60K 37/02 |
| 2018/0057008 A1* | 3/2018 | Utagawa | ................... | B60T 8/00 |
| 2018/0312171 A1* | 11/2018 | Okitsu | .................. | B60W 50/14 |
| 2018/0339707 A1* | 11/2018 | Schartner | ......... | B60W 30/18118 |

FOREIGN PATENT DOCUMENTS

| | | |
|---|---|---|
| CN | 103661371 | 3/2014 |
| DE | 10 2015 206 582 | 10/2016 |

OTHER PUBLICATIONS

Office Action dated Dec. 5, 2018 for Chinese Patent Application No. 201710153667.9 and its English translation by Google Translate.

* cited by examiner

APPARATUS FOR CONTROLLING VEHICLE AND CONTROL METHOD THEREOF

CROSS-REFERENCE TO RELATED APPLICATION

This application claims the benefit of Korean Patent Application No. 2016-0030821, filed on Mar. 15, 2016 in the Korean Intellectual Property Office, the disclosure of which is incorporated herein by reference.

BACKGROUND

1. Field

Embodiments of the present disclosure relate to an apparatus for controlling a vehicle and a control method thereof.

2. Description of the Related Art

In general, an Electronic Parking Brake (EPB) apparatus is automatically locked when a vehicle is stopped or parked and automatically released when an accelerator pedal is pressed in starting the vehicle.

For example, after a startup device is turned off, and an AVH(Automatic Vehicle Hold) device operates, the EPB apparatus performs parking.

However, in the EPB apparatus, a malfunction due to an overload of a Controller Area Network (CAN) BUS has occurred.

Accordingly, the EPB apparatus has limitations in preventing malfunction due to an overload of the CAN BUS, and further, in improving the stability and reliability when parking the vehicle.

Recently, researches on an improved apparatus for controlling a vehicle and control method thereof have been continuously carried out to improve the stability and reliability of a vehicle.

In addition, researches have been conducted on an apparatus for controlling a vehicle and control method thereof to suppress anxiety of a driver by identifying whether the parking is allowable.

SUMMARY

Therefore, it is an aspect of the present disclosure to provide an apparatus for controlling a vehicle and a control method thereof, capable of improving the stability and reliability of a vehicle when parking.

It is another aspect of the present disclosure to provide an apparatus for controlling a vehicle and a control method thereof, capable of suppressing the anxiety of a driver.

In accordance with one aspect of the present disclosure, an apparatus for controlling a vehicle, the apparatus comprising: an inputter configured to receive a start operation signal from a starter, receive an AVH mode operation signal from an Automatic Vehicle Hold(AVH), receive Wheel information, longitudinal acceleration information and AVH switch information from an Electronic Stability Control (ESC); and a determiner configured to determine whether the AVH mode operation signal is an ON operation signal when the start operation signal is an OFF operation signal, and determines whether the at least one of the wheel information, the longitudinal acceleration information and the AVH switch information is in a normal state when the AVH mode operation signal is the ON operation signal; and a controller configured to control an Electronic parking brake(EPB) to perform parking in the EPB when the at least one of the wheel information, the longitudinal acceleration information, and the AVH switch information is in the normal state.

The apparatus may determine whether the at least one of the wheel information, the longitudinal acceleration information, and the AVH switch information is in the normal state, it is determined whether the wheel information is target wheel information.

The wheel information may include at least one of a wheel velocity value and a wheel pulse signal; and the target wheel information may include at least one of a target wheel velocity value and a target wheel pulse signal.

The apparatus may determine whether the at least one of the wheel information, the longitudinal acceleration information, and the AVH switch information is in the normal state, it is determined whether the longitudinal acceleration information is target longitudinal acceleration information.

The longitudinal acceleration information may include a longitudinal acceleration value; and the target longitudinal acceleration information may include a target longitudinal acceleration value.

The apparatus may determine whether the at least one of the wheel information, the longitudinal acceleration information, and the AVH switch information is in the normal state, the controller determines whether an AVH mode ON operation signal corresponding to the AVH switch information, is continuously in an ON state for a predetermined period of time.

The apparatus may further comprise an identifier configured to identify that parking is performable by the EPB when the at least one of the wheel information, the longitudinal acceleration information, and the AVH switch information is in the normal state.

The apparatus may further comprise an identifier configured to identify that parking is not performed by the EPB when the at least one of the wheel information, the longitudinal acceleration information, and the AVH switch information is in the normal state.

In accordance with another aspect of the present disclosure, a method of controlling a vehicle includes: receiving a start operation signal from a starter; determining whether the received start operation signal is an OFF operation signal; receiving a AVH mode operation signal from an Automatic Vehicle Hold (AVH) when the start operation signal is an OFF operation signal; determining whether the AVH mode operation signal is an ON operation signal; receiving wheel information, longitudinal acceleration information, and AVH switch information from an Electronic Stability Control (ESC) when the AVH mode operation signal is an ON operation signal; determining at least one of the wheel information, the longitudinal acceleration information, and the AVH switch information received is in a normal state; and controlling an Electronic Parking Brake (EPB) to perform parking in the EPB when the at least one of the wheel information, the longitudinal acceleration information, and the AVH switch information is in the normal state.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, exemplary embodiments of the present disclosure will be described in detail with reference to the accompanying drawings. The exemplary embodiments described below are provided as examples to sufficiently transfer the spirits of the disclosure to those skilled in the art. Accordingly, the present disclosure is not limited to those embodiments described below and can be embodied in different forms. In addition, respective descriptions of well-known functions and constructions may be omitted for increased clarity and conciseness.

Figure 1:
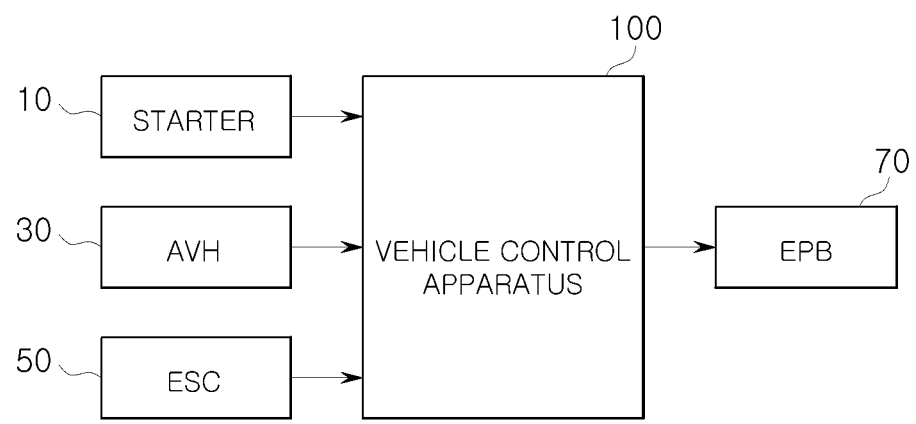
FIG. 1 is a block diagram illustrating a vehicle control apparatus which is connected to a starter, an AVH, an ESC, and an EPB in accordance with a first embodiment of the present disclosure.
Figure 2:
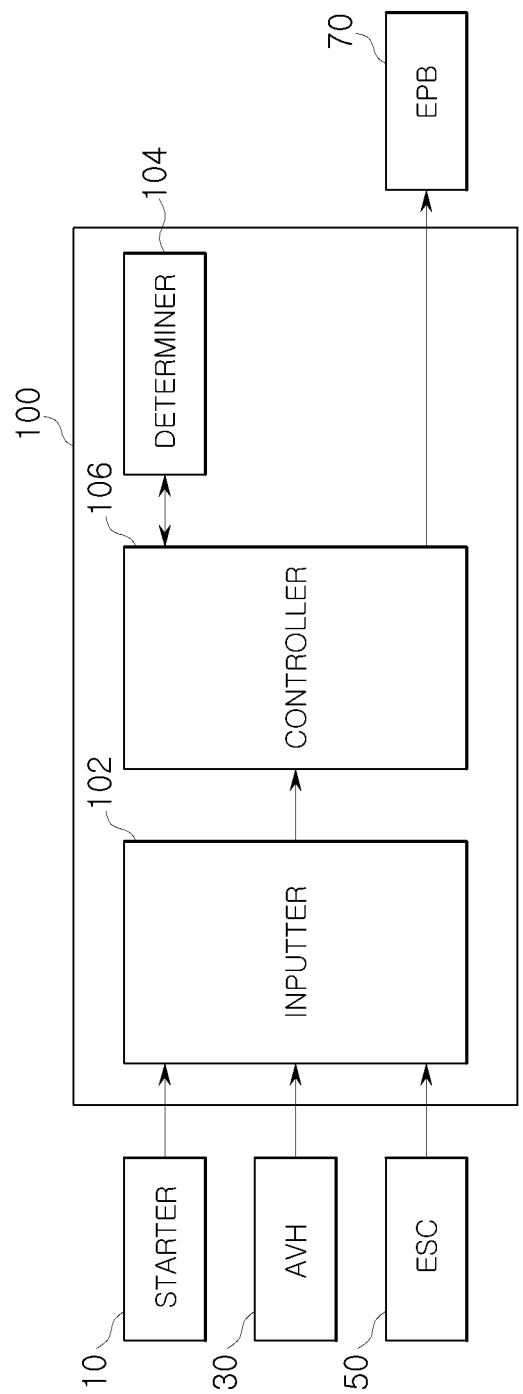
FIG. 2 is a block diagram illustrating an example of the vehicle control apparatus of show in FIG. 1.

FIG. 1 is a block diagram illustrating a vehicle control apparatus which is connected to a starter, an AVH, an ESC, and an EPB in accordance with a first embodiment of the present disclosure, and FIG. 2 is a block diagram illustrating an example of the vehicle control apparatus of FIG. 1.

Referring to FIGS. 1 and 2, an apparatus for controlling a vehicle 100 in accordance with a first embodiment of the present disclosure includes an inputter 102, a determiner 104, and a controller 106.

The inputter 102 receives a start operation signal from a starter 10, receives an AVH mode operation signal from an Automatic Vehicle Hold(AVH) 30, receives Wheel information, longitudinal acceleration information and AVH switch information from an Electronic Stability control(ESC)50.

The start operation signal may be information about ignition.

When the determiner 104 determines that the start operation signal is an OFF operation signal, the determiner 104 determines whether the AVH mode operation signal is an ON operation signal based on a control of the controller 106 to be described later.

When the determiner 104 determines that the AVH mode operation signal is an ON operation signal, the determiner 104 determines whether at least one of wheel information, longitudinal acceleration information and AVH switch information is in a normal state according to a control of the controller 106.

For example, in determining whether the at least one of the wheel information, the longitudinal acceleration information and the AVH switch information is in a normal state, he determiner 104 may determine whether the wheel information is in a rolling state of the vehicle is target wheel information based on the control of the controller 106.

At this time, the wheel information may include at least one of a wheel speed value and a wheel pulse signal, and the target wheel information may include at least one of a target wheel speed value and a target wheel pulse signal.

For example, in determining whether the at least one of the wheel information, the longitudinal acceleration information, and the AVH switch information is in the normal state, the determiner may determine whether the longitudinal acceleration information when the vehicle is located on an inclined road surface is target longitudinal acceleration information, based on the control of the controller 106.

At this time, the longitudinal acceleration information may include a longitudinal acceleration value, and the target longitudinal acceleration information may include a target longitudinal acceleration value.

For example, in determining whether the at least one of the wheel information, the longitudinal acceleration information, and the AVH switch information is in the normal state, the determiner 104 may determine whether an AVH mode ON operation signal corresponding to the AVH switch information is continuously in an ON state for a predetermined period of time when in an operating stated of a Traction Control System(TCS)(not shown) based on the control of the controller 106.

The controller 106 controls an Electronic Parking Brake (EPB) 70 to perform parking when the determiner 104 determines at least one of the wheel information, the longitudinal acceleration information, and the AVH switch information is in a normal state.

The EPB 70 may be provided as a motor on caliper (MOC) (not shown), and in order to prevent overload of the CAN (Controller Area Network) a dual CAN type may be applied to the EPB 70.

At this time, the inputter 102, the determiner 104, and the controller 106 may be provided in a typical Electric Control Unit(ECU)(not shown) that serves as a main computer of the vehicle for performing overall control, determination and input operations.

Also, the inputter 102, the determiner 104, and the controller 106 may be provided in a general Micro Control Unit (MCU) (not shown) integrating a processor, a memory, and an input/output device in a single chip, performing overall control, determination and input operations.

Also, the inputter 102, the determiner 104, and the controller 106 may be any control device, determiner device, and input device may be used as long as it can perform overall control, determination and input operations of the vehicle.

The inputter 102, the determiner 104, and the controller 106 may be intergrally provided in an ECU(not shown) or an MCU(not shown), and may be separately provided to an ECU(not shown) or an MCU(not shown).

A method of controlling a vehicle by using the vehicle control apparatus 100 according to the first embodiment of the present disclosure will be described in FIG. 3

Figure 3:
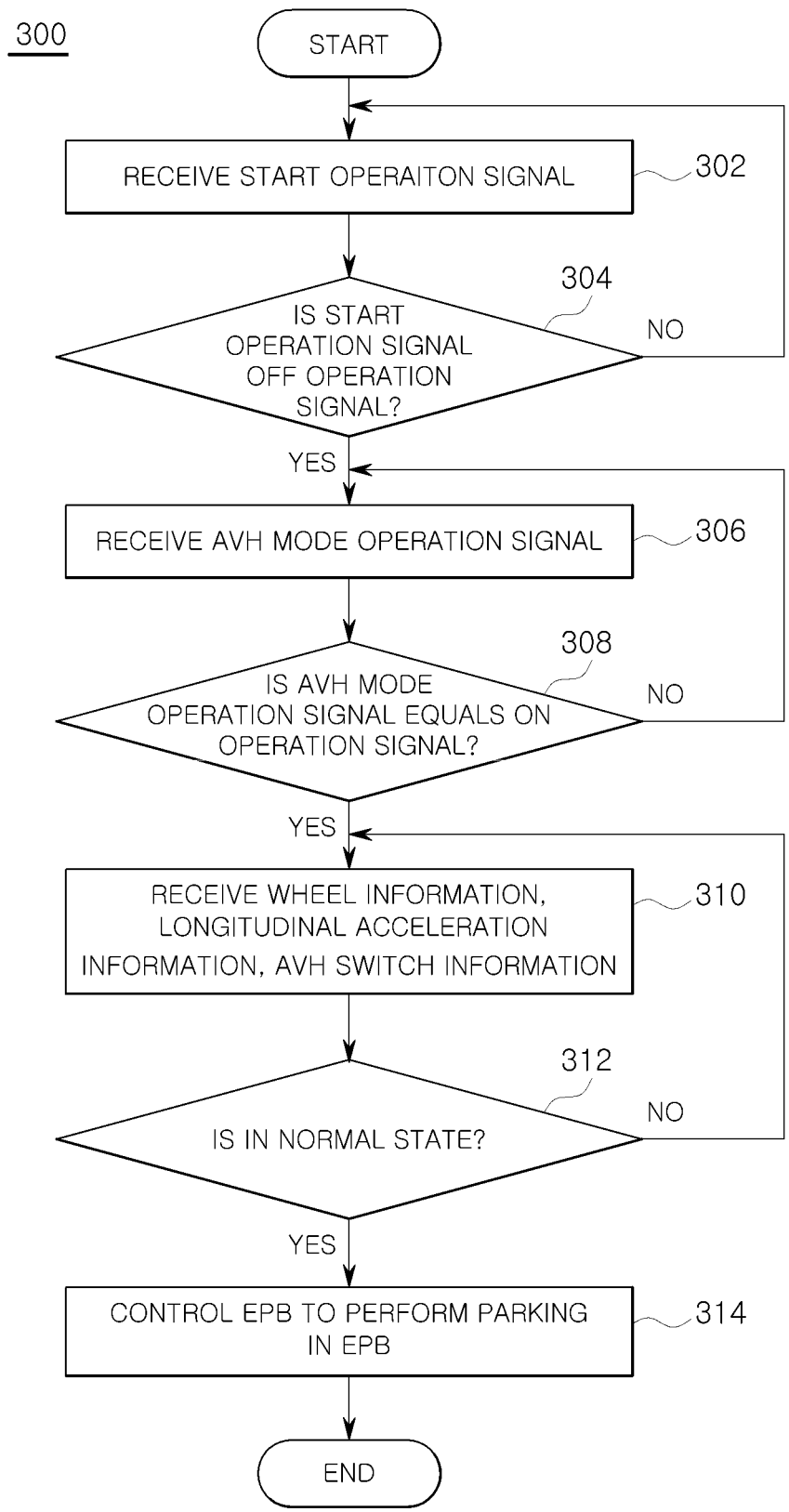
FIG. 3 is a flowchart showing a vehicle control method using the vehicle control apparatus in accordance with the first embodiment of the present disclosure.

FIG. 3 is a flowchart showing a vehicle control method using the vehicle control apparatus in accordance with the first embodiment of the present disclosure.

Referring to FIG. 3, the vehicle control method 300 using the vehicle control apparatus 100 according to the first embodiment of the present disclosure includes a first input operation (302), a first determination operation (304), a second input operation (306), a second determination operation (308), a third input operation (310), a third determination operation (312), and a control operation (314).

First, in the first input operation 302, the inputter (102 in FIG. 2) receives a start operation signal output from the starter (10 in FIG. 2).

Then, in the first determination operation 304, the determiner 104 determines whether the start operation signal received by the inputter 102 is an OFF operation signal based on the control of the controller 106.

Then, in the second input operation 306, the inputter 102 receives an AVH mode operation signal from the Automatic Vehicle Hold (AVH) (30 in FIG. 2) when the determiner (104 in FIG. 2) determines the start operation signal is the OFF operation signal.

Then, in the second determination operation 308, the determiner (104 in FIG. 2) determines whether the AVH mode operation signal received by the inputter 102 is an ON operation signal based on the control of the controller 106.

Thereafter, in the third input operation 310, the inputter (102 in FIG. 2) receives wheel information, longitudinal acceleration information, and AVH switch information outputted from the Electronic Stability Control (ESC)(50 in FIG. 2) when the determiner (104 in FIG. 2) determines the AVH mode operation signal is the ON operation signal.

Then, in the third determination operation 312, the determiner 104 determines whether at least one of the wheel information, the longitudinal acceleration information, and the AVH switch information input to the inputter 102 is in a normal state based on the control of the controller 106.

For example, when determining the normal state in the third determination operation 312, the determiner 104 determines whether the wheel information in a rolling state of the vehicle is target wheel information based on the control of the controller 106.

At this time, the wheel information may include at least one of a wheel speed value and a wheel pulse signal, and the target wheel information may include at least one of a target wheel speed value and a target wheel pulse signal.

For example, when determining the normal state in the third determination operation 312, the determiner 104 determines whether the longitudinal acceleration information when the vehicle is located on an inclined road surface is target longitudinal acceleration information based on the control of the controller 106.

At this time, the longitudinal acceleration information may include a longitudinal acceleration value, and the target longitudinal acceleration information may include a target longitudinal acceleration value.

For example, when determining the normal state in the third determination operation 312, the determiner 104 determines whether an AVH mode ON operation signal corresponding to the AVH switch information is continuously in an ON state for a predetermined period of time when in an operating state of a Traction Control System (TCS) (not shown) based on the control of the controller 106.

Then, when the determiner (104 in FIG. 2) determines the at least one of the wheel information, the longitudinal acceleration information, and the AVH switch information is in the normal state, the controller (106 in FIG. 2) controls the EPB 70 to perform parking in the control operation 314.

The vehicle control apparatus 100 and the vehicle control method 300 according to the first embodiment of the present disclosure include the inputter 102, the determiner 104 and the controller 106 to perform the first input operation 302, the first determination operation 304, the second input operation 306, the second determination operation 308, the third input operation 310, the third determination operation 312, and the control operation 314.

Therefore, the vehicle control apparatus 100 and the control method 300 according to the first embodiment of the present disclosure perform parking through EPB 70 when at least one of the wheel information, the longitudinal acceleration information, and the AVH switch information is in a normal state after the starter 10 is turned off and the AVH 30 operates.

Accordingly, the vehicle control apparatus 100 and the control method 300 according to the first embodiment of the present disclosure may prevent malfunction of the EPB 70, thereby improving the stability and reliability of the vehicle at the time of parking.

Figure 4:
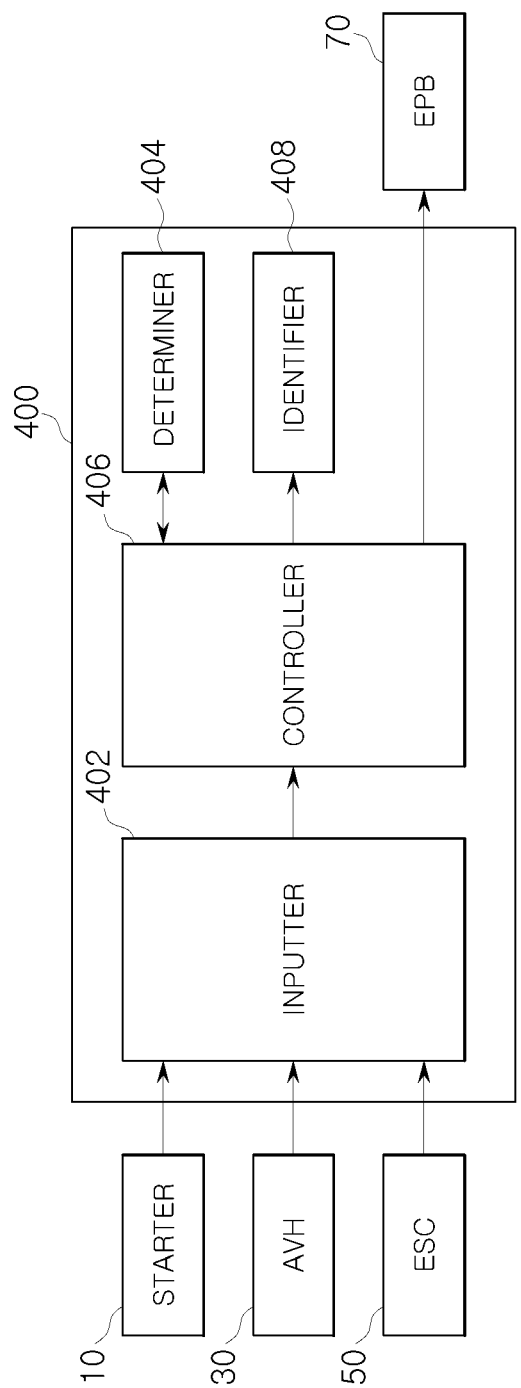
FIG. 4 is a block diagram illustrating a vehicle control apparatus in accordance with a second embodiment of the present disclosure.

FIG. 4 is a block diagram illustrating a vehicle control apparatus in accordance with a second embodiment of the present disclosure.

Referring to FIG. 4, similar to the vehicle control apparatus 100 according to the first embodiment, a vehicle control apparatus 400 according to the second embodiment of the present disclosure includes an inputter 402, a determiner 404, and a controller 406.

Since functions and systematic correlations of the inputter 402, the determiner 404, and the controller 406 of the vehicle control apparatus 400 according to the second embodiment of the present disclosure are the same as the functions and systematic correlations of the inputter (102 in FIG. 2), the determiner (104 in FIG. 2), and the controller (106 in FIG. 2) of the vehicle control apparatus (100 in FIG. 2) according to the first embodiment, additional explanations of each of the elements will be omitted below.

Here, the vehicle control apparatus 400 according to the second embodiment of the present disclosure further includes an identifier 408.

That is, when the determiner 404 determines that the vehicle control apparatus 400 is in the normal state, the identifier 408 identifies that parking is possible in the EPB 70 based on the control of the controller 406.

Also, when the determiner 404 determines that the vehicle control apparatus 400 is not in the normal state, the identifier 408 identifies that parking is not possible in the EPB 70 based on the control of the controller 406.

Although not illustrated, the identifier 408 may include at least one of an alarm (not shown), a speaker (not shown), and a light-emitting member (not shown) such that a driver to identify that parking is possible or not in the EPB 70 by at least one operation of an alarming operation of the alarm (not shown), a voice operation of the speaker (not shown), and a light-emitting operation of the light-emitting member (not shown).

In addition, although not illustrated, the identifier 408 may include at least one of a human machine interface (HMI) module (not shown) for interfacing a user and a machine such that a driver identifies vehicle information or state and a head-up display (HUD) module (not shown) provided for a driver to identify that parking is possible or not in EPB 70 by at least one operation of an HMI message display operation of the HMI module (not shown) and an HUD message display operation of the HUD module (not shown).

A vehicle control method for controlling the vehicle using the vehicle control apparatus 400 according to the second embodiment of the present disclosure will be described in FIG. 5.

Figure 5:
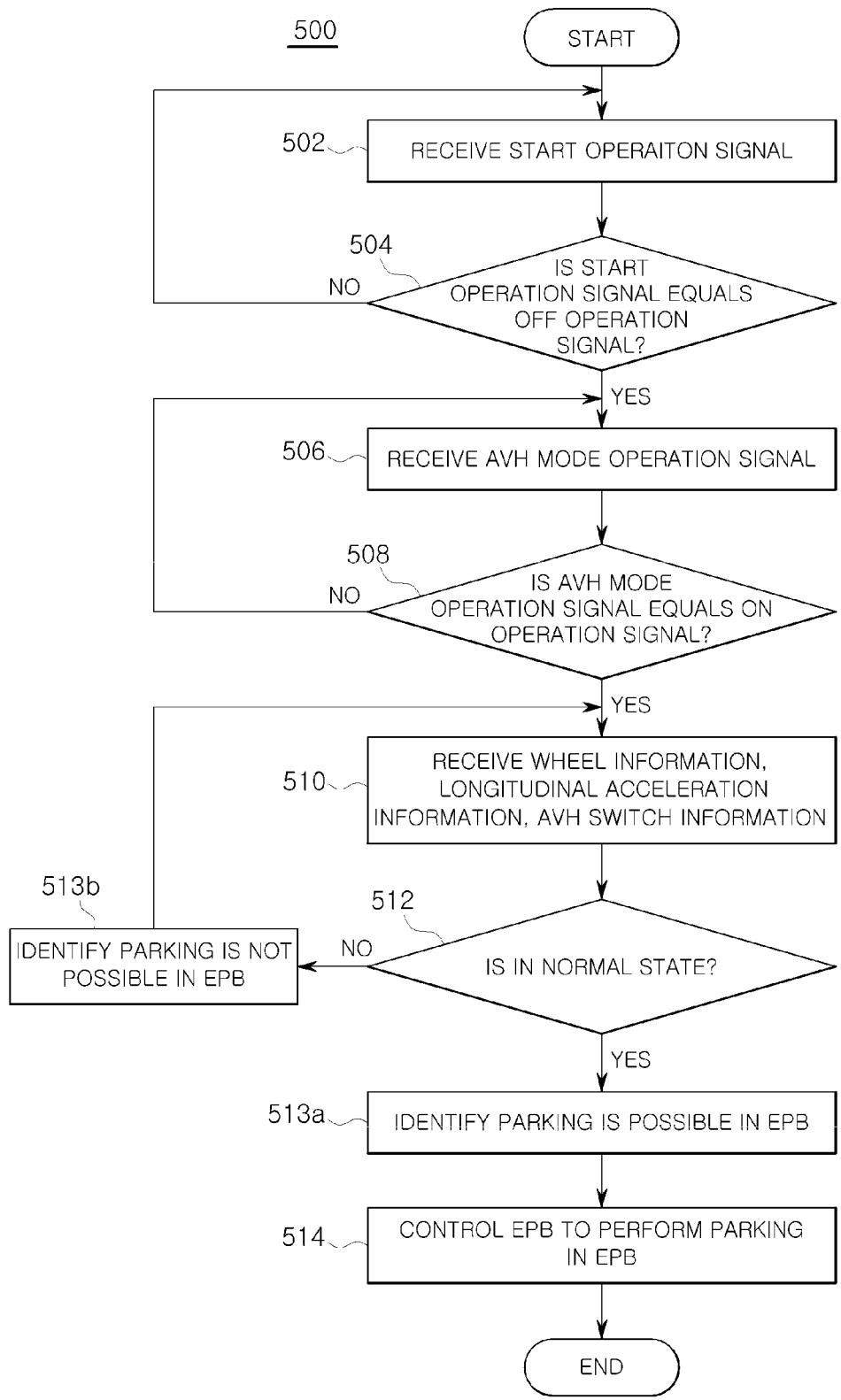
FIG. 5 is a flowchart showing a vehicle control method using the vehicle control apparatus in accordance with the second embodiment of the present disclosure.

FIG. 5 is a flowchart showing a vehicle control method using the vehicle control apparatus in accordance with the second embodiment of the present disclosure.

Referring to FIG. 5, the vehicle control method 500 of the vehicle control apparatus 400 according to the second embodiment of the present disclosure includes a first input operation 502, a first determination operation 504, a second input operation 506, a second determination operation 508, a third input operation 510, a third determination operation 512, and a control operation 514.

Since functions and systematic correlations of the vehicle control method 500 of the vehicle control apparatus 400 according to the second embodiment of the present disclosure are the same as the functions and systematic correlations of the vehicle control method 300 of the vehicle control apparatus 100 according to the first embodiment of the present disclosure, additional explanations of each of the operations will be omitted below.

The vehicle control method 500 of the vehicle control apparatus 400 according to the second embodiment of the present disclosure may further include a first identification operation 513a and a second identification operation 514b.

That is, the first identification operation 513a may be performed after the third determination operation 512 and before the control operation 514.

As another example, the first identification operation 513a may be performed in synchronization with the control operation 514, although not shown.

Therefore, when the determiner 404 determines that the vehicle control apparatus is in the normal state, in the first identification operation 513a, the identifier (408 in FIG. 4) identifies that parking is possible in the EBP 70 based on the control of the controller 406.

Also, the second identification operation 513b may be performed after the third determination operation 512 and before the control operation 514.

That is, when the determiner (404 in FIG. 4) determines that the vehicle control apparatus is not in the normal state, in the second identification operation 513b, the identifier 408 identifies that parking is not possible in the EBP 70 base on the control of the controller 406.

The vehicle control apparatus 400 and the control method 500 according to the second embodiment of the present disclosure include the inputter 402, the determiner 404, the controller 406 and the identifier 408 to perform the first input operation 502, the first determination operation 504, the second input operation 506, the second determination operation 508, the third input operation 510, the third determination operation 512, the first identification operation 513a, the second identification operation 513b and the control operation 514.

Therefore, the vehicle control apparatus 400 and the control method 500 according to the second embodiment of the present disclosure perform parking through the EPB 70 when at least one of the wheel information, the longitudinal acceleration information, and the AVH switch information output from the ESC 50 is in a normal state after the starter 10 is turned off and the AVH 30 operates.

Accordingly, the vehicle control apparatus 400 and the control method 500 according to the second embodiment of the present disclosure may prevent malfunction of the EPB 70, thereby improving the stability and reliability of the vehicle at the time of parking.

Also, the vehicle control apparatus 400 and the control method 500 according to the second embodiment of the present disclosure may identify whether parking is performed in the EPB 70 or not.

Therefore, the vehicle control apparatus 400 and the control method 500 according to the second embodiment of the present disclosure may allow a driver to recognize whether the driver is able to perform parking through the EPB 70 so that anxiety of the driver is suppressed.

As is apparent from the above description, the vehicle control apparatus and the control method in accordance with one embodiment of the present disclosure can enhance the stability and reliability of the vehicle at the time of parking.

Further, the vehicle control apparatus and the control method in accordance with one embodiment of the present disclosure can suppress anxiety of the driver.

What is claimed is:

1. An apparatus for controlling a vehicle, the apparatus comprising:
    an inputter configured to receive a start operation signal from a starter, receive an AVH mode operation signal from an Automatic Vehicle Hold (AVH), receive Wheel information, longitudinal acceleration information and AVH switch information from an Electronic Stability Control(ESC);
    a determiner configured to determine whether the AVH mode operation signal is an ON operation signal when the start operation signal is an OFF operation signal, and determine whether at least one parameter selected from a group consisting of the wheel information, the longitudinal acceleration information and the AVH switch information is in a normal state when the AVH mode operation signal is the ON operation signal; and
    a controller configured to control an Electronic parking brake (EPB) to perform parking in the EPB when the determiner determines that the at least one parameter selected from a group consisting of the wheel information, the longitudinal acceleration information, and the AVH switch information is in the normal state.

2. The apparatus of claim 1, wherein in determining whether the at least one parameter selected from a group consisting of the wheel information, the longitudinal acceleration information, and the AVH switch information is in the normal state, the determiner is configured to determine whether the wheel information is target wheel information.

3. The apparatus of claim 2, wherein the wheel information, includes at least one of a wheel velocity value and a wheel pulse signal; and
    the target wheel information includes at least one of a target wheel velocity value and a target wheel pulse signal.

4. The apparatus of claim 1, wherein in determining whether the at least one parameter selected from a group consisting of the wheel information, the longitudinal acceleration information, and the AVH switch information is in the normal state, the determiner is configured to determine whether the longitudinal acceleration information is target longitudinal acceleration information.

5. The apparatus of claim 4, wherein the longitudinal acceleration information, includes a longitudinal acceleration value; and
    the target longitudinal acceleration information includes a target longitudinal acceleration value.

6. The apparatus of claim 1, wherein in determining whether the at least one parameter selected from a group consisting of the wheel information, the longitudinal acceleration information, and the AVH switch information is in the normal state, the controller determines whether an AVH mode ON operation signal corresponding to the AVH switch information, is continuously in an ON state for a predetermined period of time.

7. The apparatus of claim 1, further comprising an identifier configured to identify that parking is performable by the EPB when the at least one of the wheel information, the longitudinal acceleration information, and the AVH switch information is in the normal state.

8. The apparatus of claim 1, further comprising an identifier configured to identify that parking is not performed by the EPB when the at least one parameter selected from a group consisting of the wheel information, the longitudinal acceleration information, and the AVH switch information is in the normal state.

9. A method of controlling a vehicle, the method comprising:

receiving a start operation signal from a starter;

determining whether the received start operation signal is an OFF operation signal;

receiving a AVH mode operation signal from an Automatic Vehicle Hold (AVH) when the start operation signal is an OFF operation signal;

determining whether the AVH mode operation signal is an ON operation signal;

receiving wheel information, longitudinal acceleration information, and AVH switch information from an Electronic Stability Control (ESC) when the AVH mode operation signal is an ON operation signal;

determining at least one parameter selected from a group consisting of the wheel information, the longitudinal acceleration information, and the AVH switch information received is in a normal state;

controlling an Electronic Parking Brake (EPB) to perform parking in the EPB when it is determined that the at least one parameter selected from a group consisting of the wheel information, the longitudinal acceleration information, and the AVH switch information is in the normal state.

10. The method of claim 9, wherein the determining whether the at least one parameter selected from a group consisting of the wheel information, the longitudinal acceleration information, and the AVH switch information is in the normal state comprises determining whether the wheel information is target wheel information.

11. The method of claim 10, wherein the wheel information, includes at least one of a wheel velocity value and a wheel pulse signal; and the target wheel information includes at least one of a target wheel velocity value and a target wheel pulse signal.

12. The method of claim 9, wherein the determining whether the at least one parameter selected from a group consisting of the wheel information, the longitudinal acceleration information, and the AVH switch information is in the normal state comprises determining whether the longitudinal acceleration information is target longitudinal acceleration information.

13. The method of claim 12, wherein the longitudinal acceleration information, includes a longitudinal acceleration value; and the target longitudinal acceleration information includes a target longitudinal acceleration value.

14. The method of claim 9, wherein the determining whether the at least one parameter selected from a group consisting of the wheel information, the longitudinal acceleration information, and the AVH switch information is in the normal state comprises determining whether an AVH mode ON operation signal corresponding to the AVH switch information, is continuously in an ON state for a predetermined period of time.

15. The method of claim 9, further comprising identifying that parking is performable by the EPB when the at least one of the wheel information, the longitudinal acceleration information, and the AVH switch information is in the normal state.

16. The method of claim 9, further comprising identifying that parking is not performed by the EPB when the at least one parameter selected from a group consisting of the wheel information, the longitudinal acceleration information, and the AVH switch information is in the normal state.

17. A method of controlling a vehicle, the method comprising:

receiving a start operation signal from a starter;

determining whether the received start operation signal is an OFF operation signal;

receiving a AVH mode operation signal from an Automatic Vehicle Hold (AVH) when the start operation signal is an OFF operation signal;

determining whether the AVH mode operation signal is an ON operation signal;

receiving wheel information, longitudinal acceleration information, and AVH switch information from an Electronic Stability Control (ESC) when the AVH mode operation signal is an ON operation signal;

determining at least one of the wheel information, the longitudinal acceleration information, and the AVH switch information received is in a normal state, wherein the normal state comprises an ON state of an AVH mode for a predetermined period;

controlling an Electronic Parking Brake (EPB) to perform parking in the EPB when it is determined that the at least one of the wheel information, the longitudinal acceleration information, and the AVH switch information is in the normal state.

18. The method of claim 17, wherein the determining whether the at least one of the wheel information, the longitudinal acceleration information, and the AVH switch information is in the normal state comprises determining whether the wheel information is target wheel information.

19. The method of claim 17, wherein the determining whether the at least one of the wheel information, the longitudinal acceleration information, and the AVH switch information is in the normal state comprises determining whether the longitudinal acceleration information is target longitudinal acceleration information.

20. The method of claim 17, wherein the determining whether the at least one of the wheel information, the longitudinal acceleration information, and the AVH switch information is in the normal state comprises determining whether an AVH mode ON operation signal corresponding to the AVH switch information, is continuously in an ON state for a predetermined period of time.

* * * * *